US009680759B2

(12) United States Patent
Robbins

(10) Patent No.: US 9,680,759 B2
(45) Date of Patent: Jun. 13, 2017

(54) DISPLAY AWARE TRANSCODER SOURCE SELECTION SYSTEM

(71) Applicant: Google Technology Holdings LLC, Mountain View, CA (US)

(72) Inventor: Clyde N. Robbins, Ambler, PA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 14/711,220

(22) Filed: May 13, 2015

(65) Prior Publication Data

US 2015/0249613 A1     Sep. 3, 2015

Related U.S. Application Data

(63) Continuation of application No. 13/562,952, filed on Jul. 31, 2012, now Pat. No. 9,049,470.

(51) Int. Cl.
| | |
|---|---|
| *G06F 15/173* | (2006.01) |
| *H04L 12/863* | (2013.01) |
| *H04N 21/41* | (2011.01) |
| *H04N 21/4402* | (2011.01) |
| *H04N 21/442* | (2011.01) |
| *H04W 4/06* | (2009.01) |
| *H04L 12/917* | (2013.01) |
| *H04L 29/08* | (2006.01) |

(52) U.S. Cl.
CPC .............. *H04L 47/62* (2013.01); *H04L 47/76* (2013.01); *H04L 67/10* (2013.01); *H04N 21/4122* (2013.01); *H04N 21/4424* (2013.01); *H04N 21/440218* (2013.01); *H04N 21/440263* (2013.01); *H04W 4/06* (2013.01)

(58) Field of Classification Search
CPC ......... H04L 47/62; H04L 47/76; H04L 67/10; H04N 21/440218; H04N 21/440263; H04N 21/4424; H04W 4/06
USPC ........................................................ 709/226
See application file for complete search history.

(56) References Cited

U.S. PATENT DOCUMENTS

| | | | |
|---|---|---|---|
| 6,343,313 B1 * | 1/2002 | Salesky ................. | G06F 3/1415 709/203 |
| 6,441,754 B1 | 8/2002 | Wang et al. | |

(Continued)

OTHER PUBLICATIONS

USPTO, Office Ation for U.S. Appl. No. 13/562,952, mailed Apr. 24, 2014.

(Continued)

*Primary Examiner* — Marceau Milord
(74) *Attorney, Agent, or Firm* — Lowenstein Sandler LLP

(57) ABSTRACT

Systems and methods for efficiently managing the resources in a delivery system may include managing the processing power of a transcoder. By managing the input selection functions of a tuner and linking the selections with functions of a transcoder, the transcoder may process fewer instructions for a given request, resulting in the ability of the transcoder to support more streams. Modifying the inputs to the transcoder that need to be transcoded, therefore, may enable the media content delivery system to support more inputs and, thereby, more media playback devices. Managing the processing power of a transcoder can more efficiently support the delivery of media content to a media playback device, particularly where the delivery system supports multiple media playback devices.

17 Claims, 3 Drawing Sheets

(56) References Cited

U.S. PATENT DOCUMENTS

| | | | |
|---|---|---|---|
| 6,532,593 B1 | 3/2003 | Moroney | |
| 6,807,676 B1 | 10/2004 | Robbins et al. | |
| 6,937,168 B2 | 8/2005 | Rao et al. | |
| 6,952,576 B2* | 10/2005 | Fish | G11B 27/105 455/414.1 |
| 7,738,766 B2 | 6/2010 | Silverman et al. | |
| 7,949,777 B2 | 5/2011 | Wallace et al. | |
| 7,954,131 B2 | 5/2011 | Cholas et al. | |
| 7,958,536 B2* | 6/2011 | Gordon | H04N 5/44 455/556.1 |
| 7,962,640 B2 | 6/2011 | Lee | |
| 7,966,642 B2 | 6/2011 | Nair et al. | |
| 7,984,177 B2* | 7/2011 | Girardeau, Jr. | H04L 1/0007 370/235 |
| 8,085,853 B2 | 12/2011 | Lin et al. | |
| 8,229,888 B1* | 7/2012 | Roskind | H04N 21/25808 707/611 |
| 8,300,696 B2 | 10/2012 | Liang et al. | |
| 8,345,677 B2 | 1/2013 | Crookes et al. | |
| 8,380,864 B2 | 2/2013 | Bowra et al. | |
| 8,429,699 B2 | 4/2013 | Rodriguez et al. | |
| 8,438,607 B2 | 5/2013 | Cholas et al. | |
| 8,503,991 B2* | 8/2013 | Swift | H04L 12/2602 455/115.1 |
| 8,582,954 B2 | 11/2013 | Watson et al. | |
| 8,594,481 B2* | 11/2013 | Cirrincione | G11B 27/10 386/200 |
| 9,049,470 B2* | 6/2015 | Robbins | H04N 21/4122 |
| 9,066,126 B2* | 6/2015 | Moroney | H04N 21/42207 |
| 9,300,919 B2* | 3/2016 | Cholas | H04N 7/17318 |
| 2005/0074063 A1* | 4/2005 | Nair | G11B 20/1262 375/240.11 |
| 2006/0031889 A1* | 2/2006 | Bennett | H04L 29/06027 725/80 |
| 2006/0095401 A1* | 5/2006 | Krikorian | H04N 21/4398 |
| 2007/0053428 A1* | 3/2007 | Saleem | H04N 19/0009 375/240 |
| 2008/0313691 A1* | 12/2008 | Cholas | H04N 21/4147 725/131 |
| 2011/0310995 A1* | 12/2011 | Dougherty, III | G02B 27/22 375/295 |
| 2015/0286369 A1* | 10/2015 | Pontual | G06F 3/04842 715/719 |

OTHER PUBLICATIONS

USPTO, Notice of Allowance for U.S. Appl. No. 13/562,952, mailed Jan. 29, 2015.

* cited by examiner

DISPLAY AWARE TRANSCODER SOURCE SELECTION SYSTEM

RELATED APPLICATION

This patent application is a continuation of U.S. Non-Provisional application Ser. No. 13/562,952, filed Jul. 31, 2012, entitled "Display Aware Transcoder Source Selection System," which is incorporated herein by reference for all purposes.

BACKGROUND

A variety of audio and/or video delivery systems exist for delivering media content to a user's media playback device. For example, a cable delivery system may include a set-top box that transmits a television program to a user's television screen. Media content delivery systems often include a transcoder for transcoding media content that is received from a content source. For example, a media content source or provider, such as a cable network, may beam a channel in high definition television (HDTV) using MPEG-4 programming. The cable delivery system in a user's home may utilize a set-top box that supports MPEG-2-only. Therefore, the cable delivery system, via a transcoder, may transcode the MPEG-4 media content to a useable MPEG-2 format.

Existing techniques for transcoding media content are less than optimal for delivery to a media playback device. Often, the transcoder consumes an unnecessary amount of power to deliver audio and/or video to the media playback devices. For example, in a typical delivery system, the processing burden is on the transcoder to make the necessary conversions for delivery of content to the media playback devices, expending execution cycles to format the data. As a result of the processing burden on the transcoder, the number of inputs the transcoder can support is limited and, accordingly, the number of outputs the transcoder can support is also limited.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

DETAILED DESCRIPTION

Disclosed herein are techniques for efficiently managing the resources in a delivery system that transcodes data for delivery to a media playback device, particularly where the delivery system supports multiple media playback devices. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

As described in more detail below, the media content delivery system 100 may manage resources by focusing the input selection functions of a tuner and linking the selections with the functions of a transcoder. Controlling the inputs to the transcoder 116 that need to be transcoded, therefore, may enable the media content delivery system to support more inputs and, thereby, more media playback devices.

In an example implementation that corresponds to the embodiments disclosed herein, a method for transcoding media content in a media content delivery system comprises identifying resolution capabilities of a target device, identifying an available transcoder bandwidth for output display resolution, comparing the resolution capabilities of the target device to a plurality of media content formats, identifying a media content format from the plurality of media content formats based on both a resolution closest to the resolution capabilities of the target device and the available transcoder bandwidth. Further, the method may include tuning to an input channel for receiving an input that corresponds to the identified media content format, providing the input to a transcoder, and transcoding the input for delivery to the target device.

In an example implementation that corresponds to the embodiments disclosed herein, a method for tuning an input channel to maximize transcoder processing power may comprise receiving a request for tuning to the input channel, wherein the request indicates a media content format selected for a requested media content, from a comparison to a plurality of media content formats, based on both a resolution closest to the resolution capabilities of a target device and an available transcoder bandwidth, searching for available content sources for an input that corresponds to the requested media content and selected media content format, receiving the input that corresponds to the requested media content and selected media content format, and providing the input to a transcoder 116.

A media content delivery system operable to transcode media content in accordance with identified media content may include interface control circuitry, comparison control circuitry, tuner control circuitry, transcoder circuitry, and output circuitry to perform the methods disclosed herein.

Figure 1:
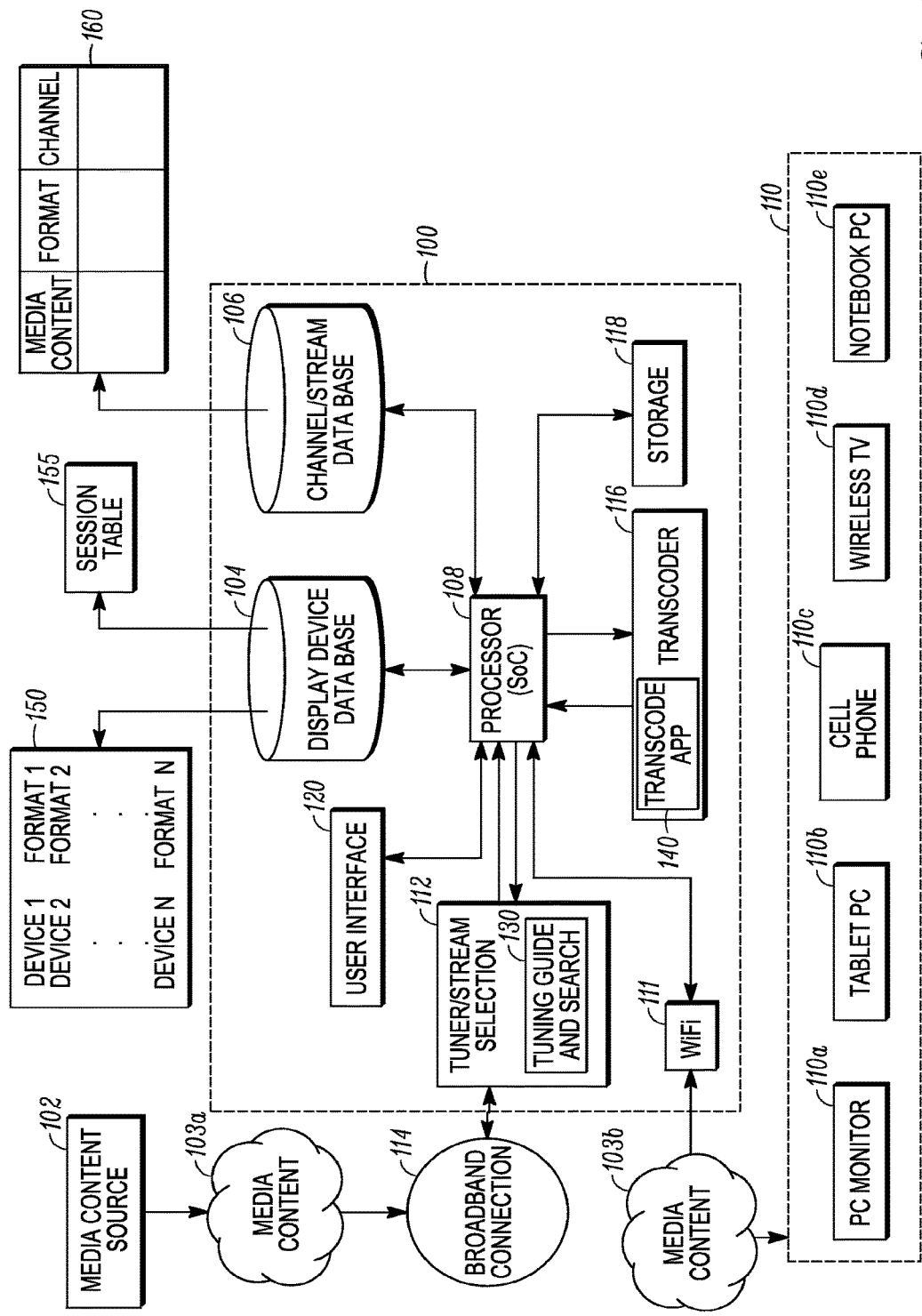
FIG. 1 depicts a network diagram that illustrates an embodiment of the hardware components of a media content delivery system.

FIG. 1 depicts a network diagram that illustrates an embodiment of the hardware components of a media content delivery system. In the example diagram, the media content delivery system 100 includes a user interface 120, a display device database 104, a channel/stream database 106, a processor (e.g., system on a chip) 108, a WiFi element 111, a tuner/stream selection module 112, a transcoder 116, and storage 118. The media content delivery system 100 may process media content 103a received from a media content source 102 and stream or otherwise communicate media content 103b to media playback devices 110.

A media content source 102 may be any provider of media content, such as a cable network or satellite network provider, a headend unit broadcasting signals, streaming content providers, a digital broadcast system (e.g., broadcast digital satellite systems, interactive Internet systems, digital cable systems, etc), or the like. The media content source 102 may provide additional services and may use the resources of additional parties in its distribution of media content to a media content delivery system. The media content source 102 may be conFIG.d to deliver the media content 103a to the media content delivery system in any suitable manner (e.g., stream, broadcast, multicast, etc). In this example, the media content 103a is delivered using a broadband connection 114 such as a cable or fiber optic connection. Alternately, the connection may be wireless such as through a satellite link or a WiMAX wireless metropolitan area network.

Examples of media content 103 include, but are not limited to, live television, recorded television, time-shifted programs, movies, any type of audio or video, music, on-demand media content, gaming content, any type of media with a display component, or the like. The media content delivery system 100 may utilize any suitable method or device for delivering media content to a media playback device. For example, cable delivery systems often use a set-top box to deliver television content to a television via a wired or wireless connection, whereas a cable modem may deliver internet content to a computer or PC using a wired or wireless connection.

Media content delivery systems 100, such as cable and/or internet video and audio delivery systems, have evolved such that users can access media content on various media playback devices. A media content delivery system 100 may support a plurality of media playback devices, such as the plurality of example media playback devices 110 shown in FIG. 1 (i.e., PC Monitor 110a, tablet PC 110b, cell phone 110c, wireless TV 110d, or notebook PC 110e). Other example media playback devices include, but are not limited to televisions, display devices, entertainment devices, computers, Netbook, media players, analog and digital televisions, pocket televisions, WiFi connected game systems, Blu-Ray players, mobile devices, such as tablets and mobile phones, PDAs (personal digital assistants), projectors, PSPs (portable play stations), digital watches, or the like. Such recipient devices may require a subscription to access the media content from the media content source 102.

According to an example embodiment (as shown), the processor 108 is a system on a chip (SoC), an integrated circuit commonly used in media content delivery systems for delivering media content. For example, video delivery systems that deliver video content to an end user often use SoC technology. Example video delivery systems include cable and satellite Set-Top-Boxes (STBs), Digital Video Disk (DVD) players, Game Player, laptop, Personal Video Recorders (PVRs, computers, wireless broadcast television, cell phones, or the like. A processor 108 such as a SoC may have digital, analog, mixed-signal, and/or radio frequency functions. A SoC may include a microcontroller, memory blocks, timing sources, peripherals, external interfaces, voltage regulators and power management circuits. For example, in a cable delivery system 100, a SoC may compile components for a set-top box on a single integrated circuit (IC). Other components of the media content delivery system 100, such as the tuner 112 or transcoder 116, may be integrated on the SoC or may be separate components within the media content delivery system 100.

References to a processor 108 herein are intended to include a system on a chip or a processor having system on a chip capabilities. Further, the processor 108 may include any appropriate type of processor such as a single processor, multiple processors that can be distributed or centrally located, or the like. For example, the processor 108 can be a video source device processor, a computer processor, a handheld processor, or the like. The processor 108 can include any other suitable hardware such as a tuner, transcoder, cache, Random Access Memory, storage devices, or the like and/or software.

The provision of media content 103a to the media content delivery system 100 may be triggered in a number of different ways. For example, an end user, a media playback device, a user associated with the end user, a selection via a remote control, a provider of media content, or any other $3^{rd}$ party entity may request or otherwise trigger the provision of the media content.

The example user interface 120 depicted in FIG. 1 is an example of an interface by which the user may select an asset, or media content, to stream on a media playback device. The user interface 120 represents any suitable user interface or plurality of user interfaces that may process inputs and communicate such inputs to the media content delivery system 100 for processing. The user interface 120 may include, for example, an input/output portion such as a keypad, a touch screen, a button, a microphone, or the like, and an output component such as a speaker, a microphone, or the like. Various circuitries may be employed by the delivery system 100 to facilitate the delivery/receipt of media content in accordance with the identified media content. For example, interface control circuitry may be operable to receive and process display requests input at the user interface.

In an example embodiment, the media content 103a to be delivered to the media content delivery system 100 is determined based on a manual input request at a user interface 120. For example, in a cable delivery system 100, a user may manually select a channel via a remote control, where the channel is associated with high definition media content. The user interface may instead, or also, be integrated with the media playback device 110. A user may make a request for media content via the user interface on the media playback device.

In another example, the media playback device 110 may include processing resulting in a request for a particular media content, such as a trigger for secondary media content when a request for primary media content is made. In another example, a provider of media content 102 may determine to provide media content to the SoC. For example, a television distributor may elect to provide secondary media content to a user when fulfilling the request for primary media content. The television distributor may want to provide advertisements to an end user, or may be tracking preferences and/or previous elections of media content by a particular user or device and elect to provide similar media content that is delivered along with the primary media content or separately from the primary media content. The television distributor may send the request for media content to the SoC or to the media content delivery system 100 for providing the primary and/or secondary media content to the SoC.

A tuner 112 may tune to a desired channel for receiving media content 103a from the media content source 102. In the example described above, the tuner 112 may select content based on a manual input request, such as an external source of signal from a remote control. The tuner 112 may select content by tuning to a channel corresponding to the manual input request, e.g., a selection via the remote control, to receive an input, e.g., a broadcast signal from a cable network. The tuner 112 may convert the signal into content which is displayed on a display device, such as a television screen. Thus, the tuner 112 may select media content as a direct result of the user's selection. The media content delivery system 100 may perform further processing on the input. For example, in a cable delivery system 100, the tuner 112 may process inputs from the media content source 102 and produce digital outputs (e.g., MPEG packets) for further processing in a set-top box. The tuner 112 may utilize a tuning guide and search module 130 to search for an appropriate channel to which to tune the tuner 112.

The media content delivery system 100 may employ a transcoder 116 to transcode the media content. The transcoder 116 performs conversions on the input stream(s). For example, the transcoder 116 may perform various tasks, such as data rate changing, compression code changing, resolution and frame rate changing, file format changing, and content security management. As the content is played back on the media playback devices 110, real time transcoding may occur.

Thus, following receipt of the media content 103a from a media content source 102, the media content delivery system 100 may transcode the media content via transcoder 116 and deliver a media content 103b suitable for playback on media playback device(s) 110. It may be suitable that the transcoder 116 transcode the media content 103a to a format that is relevant to the media content delivery system 100, such as transcoding the media content 103a in a selected coding format and resolution suited for the set-top box. For example, formats may need to change from an MPTE_2HD format as received by a STB via broadcast to an MPEG-4 format. Or, the transcoder 116 may receive media content 103a and change the format, bit rate and/or resolution in order to play it back on a media playback device 110.

Consider the cable delivery system 100 example, where a set-top box implementation of the media content delivery system 100 receives high definition media content, and is delivering the content to a portable playback device, such as a cell phone 110c, that cannot display high definition media content due to display resolution or power constraints. The transcoder 116 may code and recode digital content from one compressed format to another to enable transmission and display by various media playback devices 110. Thus, the processing burden is on the transcoder 116 to change the resolution of the media content to meet the lower resolution screen of the portable device's power constraints.

The efficiency of the transcoder 116 may impact the efficiency of the media content delivery system 100. Variables that may impact the efficiency of the transcoder include the transcoder's processing power, the number of requests for media content, the extent that the requests require concurrent use of the transcoder's processing power, the number of format options for the media content, the number of inputs from a media content source 102 or tuner, the number of media playback devices 110 requesting such content, etc. For example, a transcoder 116 typically spends more processing power encoding and decoding high definition media content than standard definition media content. Transcoding high definition content, for example, is complex and requires more processing power than transcoding standard definition content, because of the size of the files and details in the high definition content.

Further, there may be combined total processing bandwidth limitations in a delivery system 100 environment, such as a home environment. For example, consider an example media content delivery system 100 in an home environment, a video messaging system (VMS), that can support up to four high definition transcode streams simultaneously. In a typical media content delivery system 100, the media content would deliver all four streams at the highest format available, in high definition. By transcoding to a lower resolution, frame rate, or higher efficiency compression format, based on the known display device capabilities of individual media playback devices 110, more media streams and display devices can be supported simultaneously in the available VMS bandwidth.

However, while maximizing the playback quality of the four streams output from the VMS may be desirable in some circumstances, there may be more efficient ways to manage the processing power of the transcoder 116. Blindly requesting content 103a at the highest resolution is not always optimal. For example, there may be more than four media playback devices 110 designated for receiving media content. The example home environment may include a gaming system, a tablet, a PC, a television, a laptop, and a mobile device that are all capable of playing back media content for viewing. In addition, the media playback devices 110 in the home environment that are requesting media content through the VMS, for example, may not have high definition capabilities or resolution capabilities of larger, more sophisticated displays. For example, a smaller portable device, such as a cell phone 110c or tablet, may have smaller resolution capabilities. Therefore, the VMS may consume unnecessary computing power if the transcoder 116 transcodes high definition streams for a cell phone 110c or tablet in this instance.

The techniques disclosed herein manage resources in the media content delivery system 100 by focusing the input selection functions of a tuner 112 and linking the selections with the functions of a transcoder 116. Thus, to improve the efficiency of the transcoder 116, the media content delivery system 100 can modify the inputs to the transcoder 116. For example, to reduce the unnecessary consumption of power, the delivery system 100 may input a lower definition source into the transcoder 116 for delivery to a media playback device that is not equipped to handle high definition video, thus decreasing the processing power spent on decoding and encoding by the transcoder 116. Controlling the inputs to the transcoder 116 that need to be transcoded, therefore, may enable the media content delivery system 100 to support more inputs and, thereby, more media playback devices 110. In the example VMS described above, the transcoder 116 may support the processing of more than four inputs if some of the inputs to the transcoder 116 are in standard definition rather than high definition.

In an example embodiment, the transcoder 116 is linked to a tuner 112 that tunes a selection to match the display resolution of the recipient device to minimize transcoder 116 processing power. If the display resolution of a recipient media content playback device is taken into consideration in the tuning or selections process, the transcoding processing resources can be maximized. For example, when a video source resolution is available in high definition, but the mobile device preferred video display resolution is only VGA (640×480 pixels), significant processing instructions and power can be saved by alternatively selecting a standard definition source instead of the high definition source. For example, the tuner 112 may utilize a tuning guide and search application 130 to communicate with a transcode application. The transcoding application 140 may pass the preferred display device source resolution to the tuning/search application 130. The tuner 112 may identify the available source that provides media content, having a resolution that is equal to or the lowest step available that is not lower than the mobile display resolution, for providing inputs to the transcoder. Thus, in real-time, the delivery system 100 can tune an input stream for more efficiently transcoding media content 103b based on the media playback device to which the content is to be delivered.

The tuner 112 may select the transmission that most closely correlates to the requirements or capabilities of the target media playback device. For example, the SoC may instruct the tuning function to acquire a selected stream, which may be fed in to the transcode function for delivery to the target. To do this, the tuning/selecting application may be aware of the current transcoder application requirement for output display resolution (rather than operating as a separate and independent tuning/selecting system). The tuner 112 may intelligently select a stream for input 103*a* to the media content delivery system 100, thereby efficiently linking the functions of the tuner 112 and the transcoder 116. The tailored selection of a source of media content 103*a* by the tuner 112 may more effectively use the processing power of the transcoder 116.

In an example embodiment, the tuner 112 cross-references the type of media playback device with the channel/stream, and selects an input that corresponds to the media playback device 110. For example, to tune the input streams properly based on the intended media playback device 110, the delivery system 100 may access a display device database 104 and a channel/stream database 106. The channel/stream database 106 may maintain a channel map 160. The channel/stream database 106 may provide information regarding where media content resides in the broadcast environment. For example, a set-top box can process both standard definition and high definition content. The channel stream database may identify the format of the available channels. As shown in FIG. 1, the SoC may communicate with the display device database 104 and channel/stream database 106, though it is noted that any of the components in the delivery system 100 may communicate with or otherwise access these databases.

A display device database 104 may include a device/format mapping table 150 that correlates various media playback devices 110 with a format suitable for playback on each respective device. For example, a HDTV television may be correlated with a high definition format. The media playback devices 110 may be categorized based on acceptable formats or best fit formats. The display device database 104 may include subscriber-specific parameters of the media playback devices 110 and parameters regarding the overall household or business environment that includes the media playback devices 110. For example, the media playback devices 110 may be given a priority in the database that indicates the importance of the playback quality for a given media playback device 110. The result may be to deliver a lower format for devices that are of lower priority to support additional devices or, in another example, formatting the media content to maximize the format delivered where more processing power is available.

The delivery system 100 may monitor a processing bandwidth availability of the environment, such as a bandwidth available to provide any one or combination of services, e.g., standard definition (SD) service, the number of standard definition services, the number of high-definition (HD) services, or the like. The processor 108 may determine the processing capability of the delivery system 100 and determine the optimal input formats for delivery for the recipient media playback devices 110.

In an example embodiment, the display device database 104 includes a session table 155 that correlates currently supported media playback devices 110 with their current media content formats. For example, the session table 155 may identify that a first media playback device 110 is receiving a first media content stream, such as a high definition media content stream, of a first service, and a second media playback device 110 is receiving a second media content stream of a second service. The processor 108 may evaluate the session table and make real-time changes as processing requirements change, media content availability changes, the number of requests for media content increases or decreases, the number of media playback devices 110 the delivery system 100 is supporting changes, or the like. For example, a third media playback device 110 may request media content, where the transcoder bandwidth cannot support the request while supporting the first and second media playback devices 110. The second media playback device 110, in this example, may be a lower priority device or be suited for a media content format that is of lower resolution than it is currently receiving. Thus, the tuner 112 may acquire a different input stream to input to the transcoder 116 for the second media playback device 110 that provides the transcoder 116 with the processing bandwidth to process a third media content request.

The display device or channel/stream databases, 104, 106 in various embodiments, may be a text file, relational database, or object database. Each of the databases 104, 106 may be any form of data storage, including a storage module, device, or memory, for example. The databases 104, 106 either separately or combined, may be provided as a database management system, an object-oriented database management system, a relational database management system (e.g. DB2, Access, etc), a file system, or another conventional database package. Further, the databases can be accessed via a Structure Query Language (SQL), or other tools known to one of ordinary skill in the art. The information in the display device and/or channel/stream database 104, 106 may be structured to enable a person or program to extract desired information so that the delivery system 100 can access information related to the media playback devices 110 and the channel/stream options available for the delivery system 100. The databases, 104, 106 may operate to store multiple media playback device identifiers, where each media playback device identifier is associated with a format and/or a channel. The databases may be locally accessible or remotely accessible, such as via cloud storage.

Example networks 111, 114 shown are broadband connection and WiFi. It is noted that any appropriate networks for communicating within the media content delivery system 100, to media playback devices 110 in the environment supported by the media content delivery system 100, or the media content source 102, are acceptable. For example, the network 114 over which the media content source 102 and media content delivery system 100 communicate shown in FIG. 1, in this example embodiment, is a broadband connection, and the network 111 over which the media content delivery system 100 communicates within the system and with media playback devices 110, is a WiFi network. The use of comparable network architectures are contemplated, including but not limited to, any of a LAN, a Personal Area Network (PAN) such as a Bluetooth network, a wireless LAN (e.g., a Wireless-Fidelity (Wi-Fi) network), a Wide Area Network (WAN), or a Virtual Private Network (VPN), for example. The system also contemplates network architectures and protocols such as Ethernet, Internet Protocol, and Transmission Control Protocol.

The network 111, 114 may include a wired and/or a wireless network. The network 111, 114 can also be implemented using any type of network topology and/or communication protocol, and can be represented or otherwise implemented as a combination of two or more networks, to include IP-based networks and/or the Internet. The communication network may also include cable operator networks that are managed by a cable network operator and/or other network operators, such as a communication service provider, cell-phone provider, and/or Internet service provider.

The media content delivery system 100 also shows a storage device 118. The storage device 118 may store information about the media playback devices 110 in a particular environment, a history of formats used for different systems in different environments, or the like. A storage device 118, (such as a Serial ATA (SATA) hard disk drive, optical drive, Small Computer System Interface (SCSI) disk, flash memory, cloud storage, or the like) may be a non-removable media, such as a computer chip installed in the mobile device, a removable media (e.g., a SIM card, a Secure Digital card, a flash drive, a USB drive, magnetic tape, floppy disk, a compact disc, or the like) or a removable drive such as a removable hard drive.

Instead of an in-home or in-office media content delivery system 100, the media content delivery system 100 may correspond to a headend that distributes media content, such as via a cable television system or as multicast IP (e.g., also commonly referred to as broadband television, or as Internet television). Transcoding in a headend-based system, for example, can be at home in the device or partway in the system, such as in a node most of the way downstream, but not quite in the home (e.g., a feed for fifty homes). A television channel, for example, may be distributed as multiple media content streams at differing bitrates to accommodate different client device system download parameters, such as available transcoder bandwidth, standard definition or high definition playback capabilities, and/or the number of media content streams that are currently streaming in a household or business environment. Thus, managing the transcoder 116 in the headend in accordance with the disclosed techniques may be beneficial.

Figure 2:
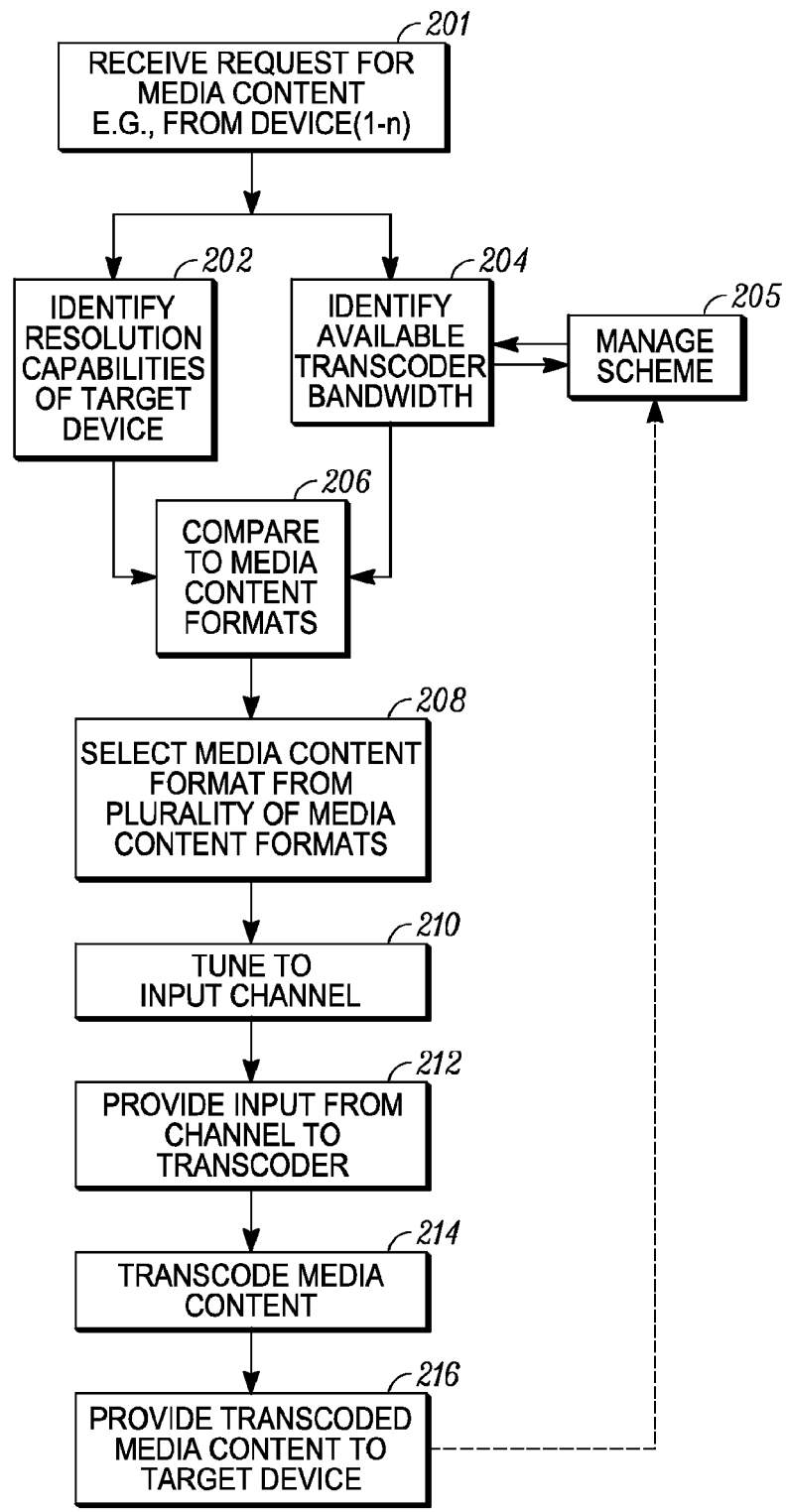
FIG. 2 depicts a flow diagram of a method for transcoding media content in accordance with example embodiments disclosed herein.
Figure 3:
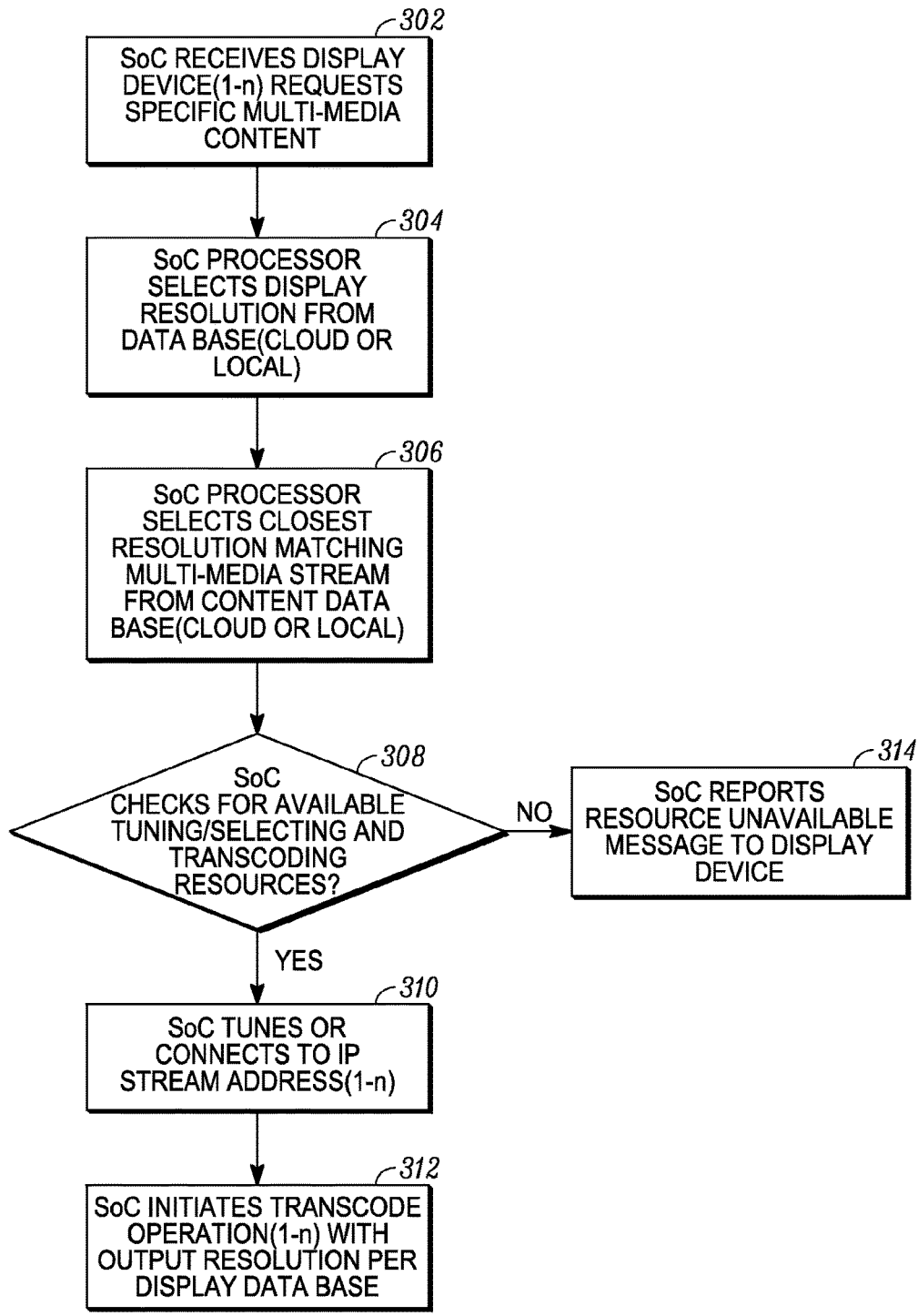
FIG. 3 depicts a flow diagram of an example embodiment for transcoding media content.

FIG. 2 depicts a flow diagram of a method for transcoding media content in accordance with example embodiments disclosed herein, and FIG. 3 depicts a flow diagram of an example embodiment for transcoding media content. The components depicted in FIG. 1 may be used to perform the methods shown in FIGS. 2 and 3. For example, as described above, a SoC or other type or processor 108 may select a media content from a plurality of media contents, shown as 208 or 306 in FIGS. 2 and 3, respectively.

At 201, a display device 110 requests media content. Multiple devices (i.e., 1-n number of devices) may be requesting media content initially or as part of an ongoing request. At 202, the media content delivery system 100 may identify resolution capabilities of the display device, also referred to herein as a target device 110 for the media content delivery system 100. Consider an example in which a user selects a hyperlink from the display component of the user's tablet PC, where selection of the hyperlink serves as a request from the tablet PC for media content. The media playback device 110, or tablet PC in this example, may transmit a media content request to the media content delivery system 100, via WiFi or some other network connection, for example. The tablet PC may include with the request information regarding the device's resolution capabilities. For example, the information regarding resolution capabilities may be in the form of metadata. In another example, the tablet PC may provide information identifying its brand/model. The media content delivery system 100 may use information provided or otherwise retrieved to identify the resolution capabilities of the target device 110.

At 204, the media content delivery system 100 may identify available transcoder 116 processing bandwidth. For example, the transcoder 116 may provide information regarding its overall available output display resolution and/or its currently available bandwidth. If the transcoder 116 is currently transcoding three input streams, for example, the transcoder 116 may determine the remaining bandwidth available for transcoding additional media content. Thus, the media content delivery system 100 may use the overall transcoder bandwidth and/or the currently available bandwidth to determine the number/format of input streams it can additionally process/transcode. The available transcoder 116 processing bandwidth may be identified based on an amount of bandwidth remaining from a total transcoder 116 bandwidth less an amount of bandwidth employed transcoding for at least one other device.

At 205, the media content delivery system 100 may reallocate the resources of the transcoder 116 to a different scheme of media playback devices 110. For example, if the transcoder 116 is currently transcoding a stream/streams for one or more media playback devices 110, the transmission of transcoded media content to a particular device may finish (e.g., the delivery of media content to a media playback device 110 may be complete, or the media playback device is no longer requesting media content) or receive a new request for media content (e.g., a media playback device not currently being streamed to may request media content, or a media playback device currently being streamed to may request additional media content, such as via a second web page, for example). As described above, the media content delivery system 100 may maintain a session table 150 to track media content requests, formats, and processing capabilities. The media content delivery system 100 may set a hierarchy for delivery of media content to the various media playback devices 110, negotiating the formats used for the various devices served by the media content delivery system 100.

As the media playback devices 110 served by the media content delivery system 100 changes, the media content delivery system 100 may dynamically modify the outputs to the currently served media playback devices 110 to optimize the use of the transcoder. This may mean delivering lower resolution content to selected devices while delivering higher resolution content to different devices. Thus, in real-time, the delivery system 100 can determine the processing power of the transcoder 116 and the request load. The delivery system 100 may change the media content format identified for any one of the plurality of devices for which it is transcoding, thus modifying the available transcoder 116 bandwidth. The delivery system 100 may manage a priority scheme of media content formats identified for a plurality of devices to maximize a number of inputs simultaneously deliverable to the plurality of devices. The media content format identified for at least one of the plurality of devices may be changed based on the priority scheme.

In an example embodiment, the transcoder 116 may scale resolution at the transcoder 116 so that communication can support a low data rate, then provide a more complex format when there is more processing power. In this manner, the media content delivery system 100 may negotiate the media content that will be requested for a particular media playback device 110. Depending on the number/type of media playback devices 110 and available transcoder 116 bandwidth, a more or less sophisticated format may be selected. Thus, the format of the media content delivered to a media playback device 110 may be, for example, a smaller pixel count stream than that which the device can handle. The power scheme of the transcoder 116 may dictate the selection of media content formats for delivery to the media playback devices 110.

At 206, the media content delivery system 100 may compare the resolution capabilities of the target device 110, identified at 202, to a plurality of media content formats using session table 150. For example, based on both a resolution closest to the resolution capabilities of the target device 110 and available transcoder 116 processing bandwidth, identified at 204, the media content delivery system 100 may identify an appropriate media content format from the plurality of media content formats for a particular media content request (e.g., by accessing the channel map shown in table 160). The identified media content format may be selected, at 208, from a plurality of media content formats. In other embodiments, other variables may be used to identify an appropriate media content format, such as a data rate, compression amount, frame rate, file format, and content security. Thus, while embodiments disclosed herein refer to resolution capabilities, it should be understood that additional variables may be examined alone or in combination to select a media content format. For example, a mobile device may display thirty frames per second while broadcast sources may be at 60 frames per second. Thus, selecting an appropriate frame rate may require less encoding and decoding by a transcoder 116.

As described above, the delivery system 100 may comprise comparison control circuitry operable to identify resolution capabilities of a target device 110, identify available transcoder 116 bandwidth for output display resolution, compare the resolution capabilities of the target device 110 to a plurality of media content formats, identify a media content format from the plurality of media content formats based on both a resolution closest to the resolution capabilities of the target device 110 and the available transcoder 116 bandwidth.

At 210, the media content delivery system 100 tunes to an input channel for receiving an input that corresponds to the identified media content format. For example, a tuner 112 may receive a request for tuning to an input channel, the request indicating a media content format selected from the comparison of the resolution capabilities of the target device 110 to a plurality of media content formats. As described above, the selection of media content may be based on both a resolution closest to the resolution capabilities of the target device 110 and an available transcoder 116 processing bandwidth. The tuner 112 may search for available content sources for an input that corresponds to the selected media content. The tuner 112, tuned to an input channel for a selected media content, may be retuned if, for example, the media content format for the particular device is modified to accommodate a varied scheme of use of processing power by the transcoder 116.

As described above with respect to FIG. 1, the delivery system 100 may comprise tuner control circuitry 112 operable to tune to an input channel for receiving a media content input that corresponds to the identified media content format, and provide the media content input to a transcoder 116.

The tuner 112, which may be linked to the transcoder 116, tunes a selection of an input stream to a display resolution of a media playback device 110 supported by the transcoder 116, thereby minimizing processing power of the transcoder 116. For example, in the examples above, the delivery system 100 may identify the media playback devices 110 to which the VMS or set-top box are providing media content. The delivery system 100 may identify the maximums/minimums for the media content formatting options for the plurality of devices and tune the input stream designated for a particular media playback device 110 to correspond to the capabilities of that media playback device 110. Thus, the tuner may tune a selection for processing, prior to transcoding the media content. Because the tuner knows what format the display is, if it knows that it is a reduced resolution display, the tuner 112 can pick a lower resolution source, thereby saving the total computing power used by the transcoder 116 (e.g., to use less power or support more streams). For example, when the transcoder 116 is fed high definition content, but the display prefers VGA content, the transcoder 116 consumes more power and will support fewer simultaneous transcoded streams, than if a standard definition source were tuned/selected.

By linking the transcode and tuning applications, rather than having them operate independently, the maximum number of streams may be transcoded without a loss of stream quality. For example, if the number of pixels is at least a 4:1 ratio between HD and SD, improvement in number of streams processed per transcoder 116, or reduction in power/instruction cycles per stream, can be greater than 4:1. Transcoding to a lower pixel count displays by matching source resolution streams rather than from too high resolution streams may result in a significant difference in the potential output from the transcoder 116. For example, An example transcoder 116 may process only four HD to SD streams, but using the methods disclosed herein, may process ten SD to SD streams.

With the techniques disclosed herein, the number of devices that the media content delivery system 100 can support at one time may be maximized. Given that there are often multiple resolutions allowable for a given asset/service available to input to the transcoder 116, if the transcoder starts with a more appropriate input asset/stream, the cost to transcode that asset can be significantly reduced (relative to the cost of transoding a less appropriate input asset/stream). For example, if the tablet supports a (relatively) low resolution display, then the transcoder should start with the SD (rather than HD) version of the asset/stream. The cost to transcode the SD stream into the desired format, may be much less (e.g., 75% less) than transoding the corresponding HD input stream.

At 212, the input received from the input channel may be provided to the transcoder 116. As described above with respect to FIG. 1, the delivery system 100 may include transcoder 116 circuitry operable to transcode the media content input based on a resolution. For example, the tuner 112 may receive media content that corresponds to a media content selected based on both a resolution closest to the resolution capabilities of the target device 110 and an available transcoder 116 bandwidth. The tuner 112 may provide the media content to the transcoder 116 and, at 214, the transcoder 116 may transcode the media content. At 216, the media content delivery system 100 may provide the transcoded media content to the appropriate media playback device 110. For example, the delivery system 100 may include output circuitry operable to communicatively output the transcoded media content to a media content playback device. The session table managing the scheme at 205 may receive information regarding the transcoded media content provided to the various media playback devices 110. FIG. 2 shows a representative link between output 216 and 205, but any information that is collected throughout the method shown in FIG. 2 may be provided to manage the scheme at 205. Thus, the outputs at any of 208, 210, 212, 214, and 216 (as represented by link between 216 and 205) may be managed in a session table 150, as shown by managing a scheme at 205.

An example scenario is a delivery system 100 that uses a set-top box in a home with a large hard drive that receives/retrieves cable television content from a cable provider. The set-top box may feed content to multiple media playback devices 110. Thus the media content delivery system 100 may support multiple media playback devices 110, where the media playback devices have varying capabilities for handling/displaying media content. For example, a particular media playback device 110 may have certain processing or communication channel bandwidth limitations, power constraints, display capabilities, or otherwise varying levels of playback capabilities. Further, an individual media playback device 110 may be able to process and display multiple formats. For example, a high definition television may be capable of processing and displaying the high definition media content selected by the tuner 112, or the television may be capable of processing and displaying content with less sophisticated formatting. A tablet device may be capable of processing and displaying high definition media content, as well, but it may not be recognizable to a user if the content were delivered in standard definition. A small portable device, on the other hand, may not be capable of displaying high definition content, due to power constraints, for example.

A set-top box generally contains a tuner and a SoC. In an example embodiment, the tuner uses information about the media playback device 110 to select an appropriate input to the media content delivery system 100. In an example embodiment, the media content delivery system 100 is aware of the media playback devices it supports, or it receives information regarding the media playback devices that request media content from the media content delivery system 100. The SoC may identify the target media playback device 110 in response to a display request. SoC may query the media playback device 110 for device information. In another embodiment, the media playback device 110 may provide such identifying information. For example, an application may run on a user device that can communicate information about the device.

It is noted that in the example embodiments herein, references are generally made to a media content delivery system 100 with the understanding that various components in the media content delivery system 100 may perform the identified actions. For example, when describing that the media content delivery system 100 provides the transcoded media content to an appropriate media playback device 110, it should be understood that the transcoder 116, the processor 108, or any suitable component of a media content delivery system, which may or may not be shown in FIG. 1, may transmit the transcoded media content. In an example embodiment, the media content delivery system includes a control function to coordinate the display functions, the tuning functions and transcode functions. Based on a display request for a specific target device, the controller would determine the input source that most closely matches the display requirements/capabilities of the target. Based on this determination, controller would instruct the tuning function to acquire that stream, which would be fed to the transcode function for eventual delivery to the target.

FIG. 3 depicts a flow diagram of an example embodiment for transcoding media content. It is noted that FIG. 3 depicts a specific example using techniques shown in FIG. 2. However, while not all aspects of FIG. 2 are shown in FIG. 3, these aspects may be incorporated into the specific example shown in FIG. 3. For example, FIG. 3 describes that a SoC is the processor 108 that selects a display resolution, corresponding to 208, and the display resolution is selected from a plurality of formats in a database stored locally or in cloud storage. The SoC processor 108 may select the display resolution where, in this embodiment, the media content may be streamed to the media playback device 110. However, as discussed throughout, the SoC may be a different type of processor 108, or the functions of the SoC may be achieved using separate components. For example, in the embodiment shown in FIG. 3, the SoC may perform the tuning, tuning to the selected IP stream address. This is a specific embodiment of that shown by 210 and 212 in FIG. 2, where tuning may be performed by a tuner having separate circuitry from that of the SoC. Further, FIG. 3 depicts error message processing, which is an additional feature that could be incorporated into the method shown in FIG. 2. Thus, while FIG. 3 is intended to depict a specific embodiment of FIG. 2, it would be understood by one skilled in the art that aspects depicted in FIG. 2 may be differently implemented than that shown in FIG. 3, and aspects of FIG. 2 and FIG. 3 could be otherwise combined to perform the techniques disclosed herein.

At 302, a display device (1-n) requests specific multimedia content. At 304, a SoC processor 108 may select the display resolution of the display device from a database. For example, a display device database 104, as described above, may comprise a table that correlates various media playback devices with a format suitable for playback on each respective device. For example, a HDTV television may be correlated with a high definition format. The media playback devices 110 may be categorized based on acceptable formats or best fit formats. The database may be stored locally, such as in a storage 118, or the database may be stored remotely, such as in a cloud or other remote server location.

The SoC processor 108 may select, at 306, the closest resolution matching multi-media stream from the database. At 308, the SoC checks for available tuning/selecting and transcoding resources. If there are not available tuning/selecting and transcoding resources, the SoC may report a resource unavailable message to the display device at 310.

If there are available tuning/selecting and transcoding resources, at 312, the SoC may tune or connect to one or more (1-n) IP stream addresses. At 314, the SoC may initiate a corresponding one or more (1-n) transcode operation on an input stream with the output resolution identified from the display database.

The techniques disclosed herein for optimizing the efficiency of the transcoder 116 are thus desirable to improve the overall efficiency of the media content delivery system. The less instructions the transcoder 116 has to process for a given request, which can be optimized by linking the tuning functions with the transcoding functions, the more streams the transcoder 116 may be able to support. A more efficient transcoder 116 has increased flexibility such that it may process more requests, support more media playback devices 110, support more format options, and the like. In many systems, multiple versions of content are available to a transcoder (e.g., an HD version and an SD version). If the transcoder starts with an appropriate input stream to transcode, the result may be significant efficiency gains.

While example embodiments of a notification system for linking tuner and transcoding functions to manage the processing power of the transcoder have been described in connection with various computing devices, the underlying concepts can be applied to any computing device or system capable of delivery transcoded media content. The various techniques described herein can be implemented in connection with hardware or software or, where appropriate, with a combination of both. Thus, the methods and apparatus for tuning and transcoding media content, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for managing the transcoder's processing power. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. Example computer readable media that may be used to store software operable to implement the present invention include but are not limited to conventional computer system RAM, ROM, EPROM, EEPROM, hard disks, or other data storage devices.

While a system for managing a transcoder has been described in connection with the various embodiments of the various figures, it is to be understood that other similar embodiments can be used or modifications and additions can be made to the described embodiment for performing the same functions without deviating therefrom. For example, one skilled in the art will recognize that the media content delivery system described in the present application may apply to any environment, whether wired or wireless, and may be applied to any number of such devices connected via a communications network and interacting across the network. Therefore, the techniques disclosed should not be limited to any single embodiment, but rather should be construed in breadth and scope in accordance with the appended claims.

Reference throughout this specification to one embodiment, an embodiment, an example embodiment, an example, or similar language means that a particular feature, structure, or characteristic described in connection with the embodiment is included in at least one embodiment of the present techniques disclosed. Thus, appearances of the phrases in one embodiment, in an embodiment, an example embodiment, an example, and similar language throughout this specification may, but do not necessarily, all refer to the same embodiment.

What is claimed is:

1. A method comprising:
   receiving, from a first media playback device with a resolution capability, a first request for first media content;
   selecting, from a plurality of media content formats, a first media content format based on the resolution capability and an available processing bandwidth of a transcoder, wherein selecting the first media content format comprises comparing the resolution capability of the first media playback device with the plurality of media content formats, and selecting the first media content format based on the comparison;
   instructing, by a processor, a tuner to acquire a first input stream of the first media content based on the first media content format; and
   initiating, by the processor, a transcode operation on the first input stream.

2. The method of claim 1, further comprising determining the available processing bandwidth of the transcoder based on an amount of processing bandwidth remaining from a total transcoder bandwidth less an amount of processing bandwidth employed transcoding for at least one other device.

3. The method of claim 1, further comprising:
   receiving, from a second media playback device, a second request for second media content;
   selecting, from the plurality of media content formats, a second media content format; and
   initiating, by the processor, a transcode operation on a second input stream corresponding to the second media content format for delivery to the second media playback device.

4. The method of claim 3, further comprising:
   selecting, from the plurality of media content formats, a third media content format based on a priority scheme; and
   instructing the tuner to acquire a third input stream corresponding to the third media content format for delivery to the first media playback device.

5. The method of claim 4, wherein selecting, from the plurality of the media content formats, the third media content format comprises:
   identifying a priority corresponding to the first media playback device based on the priority scheme; and
   selecting the third media content format based on the priority.

6. The method of claim 4, wherein the third media content is further selected based on the available processing bandwidth of the transcoder.

7. The method of claim 4, further comprising initiating, by the processor, a transcode operation on the third input stream for delivery to the first media playback device.

8. A system comprising:
   a memory; and
   a processor operatively coupled to the memory, the processor to:
      receive from a first media playback device with a resolution capability, a first request for first media content;
      select, from a plurality of media content formats, a first media content format based on the resolution capability and an available processing bandwidth of a transcoder, wherein to select the first media content format, the processor is to compare the resolution capability of the first media playback device with the plurality of media content formats, and to select the first media content format based on the comparison;
      instruct a tuner to acquire a first input stream of the first media content based on the first media content format; and
      initiate a transcode operation on the first input stream.

9. The system of claim 8, wherein the processor is further to determine the available processing bandwidth of the transcoder based on an amount of processing bandwidth remaining from a total transcoder bandwidth less an amount of processing bandwidth employed transcoding for at least one other device.

10. The system of claim 8, wherein the processor is further to:
    receive, from a second media playback device, a second request for second media content;
    select, from the plurality of media content formats, a second media content format; and
    initiate a transcode operation on a second input stream corresponding to the second media content format for delivery to the second media playback device.

11. The system of claim 10, wherein the processor is further to:
    select, from the plurality of media content formats, a third media content format based on a priority scheme; and
    instruct the tuner to acquire a third input stream corresponding to the third media content format for delivery to the first media playback device.

12. The system of claim 10, wherein, to select the third media content format, the processor is further to:
  identify a priority corresponding to the first media playback device based on the priority scheme; and
  select the third media content format based on the priority.

13. The system of claim 10, wherein the processor is further to select the third media content based on the available processing bandwidth of the transcoder.

14. The system of claim 10, wherein the processor is further to initiate a transcode operation on the third input stream for delivery to the first media playback device.

15. A non-transitory machine-readable storage medium storing instructions which, when executed, cause a processing device to:
  receive from a first media playback device with a resolution capability, a first request for first media content;
  select, from a plurality of media content formats, a first media content format based on the resolution capability and an available processing bandwidth of a transcoder, wherein to select the first media content format, the processing device is to compare the resolution capability of the first media playback device with the plurality of media content formats, and to select the first media content format based on the comparison;
  instruct a tuner to acquire a first input stream of the first media content based on the first media content format; and
  initiate a transcode operation on the first input stream.

16. The non-transitory machine-readable storage medium of claim 15, wherein the processor is further to determine the available processing bandwidth of the transcoder based on an amount of processing bandwidth remaining from a total transcoder bandwidth less an amount of processing bandwidth employed transcoding for at least one other device.

17. The non-transitory machine-readable storage medium of claim 15, wherein the processor is further to:
  receive, from a second media playback device, a second request for second media content;
  select, from the plurality of media content formats, a second media content format; and
  initiate a transcode operation on a second input stream corresponding to the second media content format for delivery to the second media playback device.

* * * * *